(12) United States Patent
Akif et al.

(10) Patent No.: US 10,112,562 B2
(45) Date of Patent: Oct. 30, 2018

(54) DEFORMATION ELEMENT ARRANGEMENT AND MOTOR VEHICLE HAVING A DEFORMATION ELEMENT ARRANGEMENT

(71) Applicant: Bayerische Motoren Werke Aktiengesellschaft, Munich (DE)

(72) Inventors: Oeztzan Akif, Munich (DE); Gerhard Fichtinger, Grasbrunn (DE); Wilhelm Riedl, Pfaffenhofen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/299,502

(22) Filed: Oct. 21, 2016

(65) Prior Publication Data

US 2017/0036625 A1    Feb. 9, 2017

Related U.S. Application Data

(63) Continuation of application No. PCT/EP2015/058134, filed on Apr. 15, 2015.

(30) Foreign Application Priority Data

Apr. 23, 2014  (DE) .................. 10 2014 207 644

(51) Int. Cl.
   *B60R 19/20* (2006.01)
   *B60R 19/22* (2006.01)
   (Continued)

(52) U.S. Cl.
   CPC ............ *B60R 19/20* (2013.01); *B60R 19/023* (2013.01); *B60R 19/18* (2013.01); *B60R 19/22* (2013.01); *B60R 2019/007* (2013.01)

(58) Field of Classification Search
   CPC ....... B60R 19/20; B60R 19/023; B60R 19/18; B60R 19/22; B60R 2019/007
   See application file for complete search history.

(56) References Cited

U.S. PATENT DOCUMENTS

| | | |
|---|---|---|
| 3,870,130 A | 3/1975 | Miller |
| 4,737,407 A * | 4/1988 | Wycech .................... B29B 9/06 |
| | | 264/143 |

(Continued)

FOREIGN PATENT DOCUMENTS

| | | |
|---|---|---|
| DE | 21 35 474 | 2/1972 |
| DE | 23 24 402 | 11/1973 |

(Continued)

OTHER PUBLICATIONS

German-language Search Report issued in counterpart German Application No. 10 2014 207 644.7 dated Dec. 17, 2014 with partial English translation (13 pages).

(Continued)

*Primary Examiner* — Drew J Brown
(74) *Attorney, Agent, or Firm* — Crowell & Moring LLP

(57) ABSTRACT

A deformation element arrangement is provided for a motor vehicle, having a deformation element and a vibration-generating device. The vibration-generating device is arranged and designed in such a way that the deformation element, when required, can be set in vibration so that a deformation behavior and/or a flow behavior of the deformation element is/can be varied in accordance with a request condition.

19 Claims, 1 Drawing Sheet

(51) Int. Cl.
    *B60R 19/02* (2006.01)
    *B60R 19/18* (2006.01)
    *B60R 19/00* (2006.01)

(56) References Cited

U.S. PATENT DOCUMENTS

| | | | |
|---|---|---|---|
| 4,853,270 | A | 8/1989 | Wyeech |
| 6,701,529 | B1* | 3/2004 | Rhoades .............. C08L 83/14 2/2.5 |
| 7,498,276 | B2* | 3/2009 | Wagner ............ A41D 31/0061 2/2.5 |
| 9,303,709 | B2* | 4/2016 | Manes ..................... F16F 9/53 |
| 2005/0087410 | A1* | 4/2005 | Namuduri ............... F16F 9/36 188/267.2 |
| 2005/0269805 | A1 | 12/2005 | Kalliske et al. |
| 2005/0275246 | A1 | 12/2005 | Browne et al. |
| 2007/0107778 | A1* | 5/2007 | Bettin ................... A42B 3/121 137/13 |
| 2008/0172157 | A1 | 7/2008 | Hall et al. |
| 2015/0288300 | A1* | 10/2015 | Hasegawa ............ H01L 41/125 310/26 |
| 2015/0367796 | A1* | 12/2015 | Farooq ................... B60R 19/20 293/109 |

FOREIGN PATENT DOCUMENTS

| | | |
|---|---|---|
| DE | 100 16 916 A1 | 10/2001 |
| DE | 102 33 593 A1 | 2/2004 |
| DE | 103 05 868 A1 | 8/2004 |
| DE | 10 2005 025 631 A1 | 1/2006 |
| DE | 10 2006 026 447 A1 | 12/2007 |
| DE | 10 2007 059 595 A1 | 6/2009 |
| GB | 2 384 215 B | 5/2005 |
| WO | WO 97/34785 A1 | 9/1997 |

OTHER PUBLICATIONS

International Search Report (PCT/ISA/210) issued in PCT Application No. PCT/EP2015/058134 dated Jul. 29, 2015 with English translation (7 pages).
German-language Written Opinion (PCT/ISA/237) issued in PCT Application No. PCT/EP2015/058134 dated Jul. 29, 2015 (5 pages).

* cited by examiner

DEFORMATION ELEMENT ARRANGEMENT AND MOTOR VEHICLE HAVING A DEFORMATION ELEMENT ARRANGEMENT

CROSS REFERENCE TO RELATED APPLICATIONS

This application is a continuation of PCT International Application No. PCT/EP2015/058134, filed Apr. 15, 2015, which claims priority under 35 U.S.C. § 119 from German Patent Application No. 10 2014 207 644.7, filed Apr. 23, 2014, the entire disclosures of which are herein expressly incorporated by reference.

BACKGROUND AND SUMMARY OF THE INVENTION

The present invention relates to a deformation element arrangement for a motor vehicle as well as to a motor vehicle having such a deformation element arrangement.

From German Patent document DE 102006026447 A1, an impact absorber with a variable viscosity for a motor vehicle body is known. The impact absorber has a foam structure whose rigidity can be adjusted in a controlled, variable manner by a so-called crash sensor system. The foam consists of a polymer whose pores are filled with a fluid medium. When the crash sensor system detects that a pedestrian protection is required, the impact absorber will be set to a soft state or will be left in the latter. In contrast, when the crash sensor system detects a hard impact of the vehicle, the impact absorber will be set to a hard state or will be left in the latter. The polymeric foam is filled, for example, with an electrorheological or a magnetorheological fluid. The viscosity and/or compressibility of the fluid in the polymeric foam can be changed over by means of an electric or magnetic field.

Under certain circumstances, generating an electric and/or magnetic field may be complicated, require high expenditures and be energy-intensive. Furthermore, a so-called magnetorheological fluid consists of a carrier fluid with metallic particles contained therein. In this case, the particles may be subject to wear and sedimentation, so that the function of the magnetorheological fluid may become impaired over time. In addition, known electrorheological fluids are effective only in a narrow temperature range and are sensitive to environmental influences.

It is an object of the present invention to provide a deformation element arrangement for a motor vehicle, as well as a vehicle having such a deformation element arrangement, whose deformation behavior and/or flow behavior can be changed by simple effective means over a long period of time, for example, with a low energy input.

This and other objects are achieved by a deformation element arrangement for a motor vehicle according to the present invention. The deformation element arrangement for the motor vehicle has a deformation element and a vibration-generating device. The vibration-generating device is arranged and constructed such that, when required, the deformation element can be set in vibration in such a manner that a deformation behavior and/or a flow behavior of the deformation element can be varied in accordance with the a requirement condition.

Accordingly, neither an electric field nor a magnetic field is required for setting a hardness of the deformation element, and magnetorheological as well as electrorheological fluids are not necessary. Furthermore, as required, the deformation element can simply be changed in its hardness, i.e. its deformation behavior and/or flow behavior, so that it can be set corresponding to the requirement condition.

According to a preferred further development, the deformation element has a thixotropic or rheopectic material. Advantageously, the deformation element consists essentially of a thixotropic material or essentially of a rheopectic material. A flowability of a thixotropic material is increased by a mechanical shearing stress; whereas a flowability of a rheopectic material is decreased by a mechanical shearing stress. When the respective material is set into vibration by the vibration-generating device, a mechanical shearing stress of the material will occur, with the corresponding change of the flowability and thereby a change of the deformability or hardness of the material. As a result of different operating conditions of the vibration-generating device, the deformation element can be set in its hardness or deformability.

The deformation element can preferably be mounted on the motor vehicle and constructed such that, in the event of a collision of the motor vehicle with a pedestrian, it dampens an impact of the pedestrian onto the motor vehicle. In this case, the requirement condition is an impact on the pedestrian, and a deformation behavior and/or flow behavior of the deformation element is set by way of vibrations generated by the vibration-generating device such that it is sufficiently soft.

When there is no requirement condition of an impact of the pedestrian, in a different case, the deformation element is not caused to vibrate, which means that the vibration-generating device can be inactive. As a result, the deformation element has a harder construction, so that a deformation of the deformation element, as a result of the impact/collision, takes place at a higher force level. This is advantageous in that, at a higher force level, more collision energy can be absorbed over a specific deformation distance.

According to a further development of the deformation element arrangement according to the present invention, the deformation element is adapted for the arrangement on a forward vehicle end and/or on a rearward vehicle end.

This is advantageous for the case of a frontal collision or a rear collision of the motor vehicle because, in this case, as a function of the type of collision, for example, with a pedestrian or with another motor vehicle or a rigid object, the deformation element can be set in its deformation behavior and/or flow behavior according to the requirement.

In the case in which the deformation element is arranged on a forward vehicle end and/or a rearward vehicle end, the deformation element is adapted for the arrangement on a forward vehicle end and/or on a rearward vehicle end.

This is particularly advantageous for adapting the deformation element to a pedestrian protection. An arrangement between the bumper cross member and the bumper covering permits an invisible arrangement of the deformation element. Nevertheless, in the event of a collision with a pedestrian, it has a considerable effect because, at the start of the collision, the bumper covering is the first to come in contact with the pedestrian and the deformation element is situated directly behind the bumper covering, which usually has a flexible construction.

The deformation element preferably extends essentially over an entire width of the bumper cross member. As a result, the deformation element can develop its effect irrespective of the point at which the pedestrian or the object frontally collides with the motor vehicle.

According to a preferred further development, the deformation element arrangement according to the present invention also has a control unit. The control unit is adapted such that it controls the vibration-generating device as a function of a vehicle speed. As an alternative or in addition, the control unit can control the vibration-generating device as a function of a detection of an imminent collision of the motor vehicle with an object and/or a pedestrian.

Here, the terms "control" or "controlling" also comprises "regulate" or "regulating".

This further development is advantageous in that it is useful to change the deformation element to soft only in a defined speed range of the vehicle which is relevant to protecting pedestrians. Furthermore, it is advantageous for the deformation element to be changed with respect to its deformability or flowability only when a collision is actually imminent.

The control unit preferably activates the vibration-generating device in a speed range of the motor vehicle that is relevant to protecting a pedestrian and that is, for example, a range of between approximately 20 km/h and approximately 50 km/h. As a result, a deformability and/or a flowability of the deformation element is/are increased in this speed range.

As an alternative or in addition, the control unit can activate the vibration-generating device when an imminent collision of the motor vehicle with a pedestrian is detected.

According to a further development of the deformation element arrangement of the present invention, the vibration-generating device is adapted for generating vibrations in an ultrasonic range. For this purpose, a piezo actuator can, for example, be used.

Vibrations in an ultrasonic range can be generated particularly easily, require only low energy expenditures and have no disadvantageous influence on the motor vehicle.

In addition or as an alternative, the vibration-generating device can also be adapted such that it utilizes natural vibrations of the motor vehicle in order to set the deformation element in vibration. Natural vibrations of the motor vehicle may originate, for example, from specific drive assemblies. This further reduces the energy input for changing the deformability and/or flowability of the deformation element.

According to a preferred further development, the deformation element consists of an elastic shell filled with a thixotropic material, which shell is impermeable particularly for the thixotropic material. As an alternative, the deformation element may consist of an elastic shell filled with a rheopectic material, which shell is impermeable particularly for the rheopectic material.

As a result, it is ensured that, on the one hand, in a low-viscosity state, particularly in a fluid state or in a fluid-like state, the thixotropic material or the rheopectic material, will not flow out, In addition, the deformation element can be sufficiently deformed by the elastic shell.

In this case, it may be advantageous for the deformation element to have an opening through which the thixotropic material or the rheopectic material can be displaced onto the deformation element by the effect of a force.

In particular, it can then be displaced when it is in the low-viscosity or fluid or fluid-like state. The opening can be constructed corresponding to a valve.

In a first operating condition of the vibration-generating device, the thixotropic material or the rheopectic material is preferably highly viscous, especially solid, or has at least predominantly characteristics of a solid material. Furthermore, in a second operating state of the vibration-generating device, the thixotropic material or the rheopective material preferably is of low viscosity, particularly fluid, or has at least predominantly characteristics of a fluid.

The terms "predominantly solid" or "predominantly fluid" also comprise various gel-type states.

A thixotropic material has a time dependence of the flow properties, in the case of which a viscosity decreases as a result of continuous mechanical stress and increases again only after the stress has ended. In the present case, vibrations constitute mechanical stress; i.e. the more intensive the vibrations and therefore the mechanical stress, the more viscous or fluid and therefore softer the thixotropic material will be. The thixotropic material may be a non-Newtonian fluid.

As an alternative to a thixotropic material, according to the present invention, a rheopective material may be used for the deformation element, which has a behavior that is opposite to that of a thixotropic material. In this case, the vibration device is adapted in order to generate vibrations for making the rheopectic material less viscous or more solid and therefore harder. The rheopectic material may be a non-Newtonian fluid.

The above-indicated further developments of the invention are therefore useful and can be arbitrarily combined with one another.

Other objects, advantages and novel features of the present invention will become apparent from the following detailed description of one or more preferred embodiments when considered in conjunction with the accompanying drawings.

DETAILED DESCRIPTION OF THE DRAWINGS

In the following, an embodiment of the present invention will be described in reference to FIGS. 1 and 2.

Figure 1:
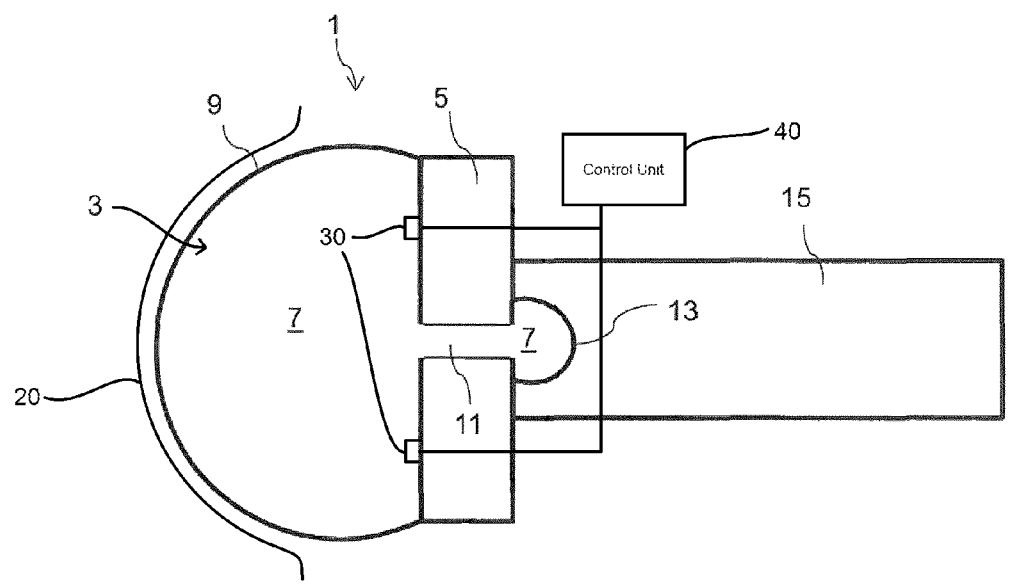
FIG. 1 is a schematic sectional lateral view of a deformation element arrangement according to an embodiment of the present invention.

FIG. 1 is a schematic sectional lateral view of a deformation element arrangement 1. In particular, the deformation element arrangement consists of a deformation element 3, which is arranged on a bumper cross member 5. The deformation element 3 is arranged between a bumper covering 20 and the bumper cross member 5. The bumper cross member 5, in turn, is mounted on two forward side-members 15, only one side member 15 being visible in the lateral view of the figures.

The deformation element 3 consists of an elastic shell 9 and a thixotropic material 7 which is accommodated inside the shell 9. The shell 9 is impermeable for the thixotropic material 7.

In a normal state, in which it is exposed to no target-oriented vibrations, the thixotropic material is essentially in a high-viscosity or solid state or in a solid-like state.

The deformation element arrangement 1 further has a vibration-generating device 30 which is arranged and constructed such that it can set the deformation element and particularly the thixotropic material 7 in vibration. The vibration-generating device preferably consists of several ultrasonic piezo actuators, which are arranged on the bumper cross member in contact with the deformation element 3 or the thixotropic material 7.

The deformation element arrangement 1 further has a control unit 40 (shown schematically), which controls the vibration generating device 30. Controlled by the control unit, the vibration generating device 30 sets the deformation element 3 in vibration, when a requirement condition has been met such that the thixotropic material 7 predominantly has the properties of a fluid or acts like a fluid. As a result, the deformation element 3 can be slightly deformed when it impacts on an obstacle.

The control unit activates especially the vibration-generating device in cases in which a protection of pedestrians is required who collide with the motor vehicle by way of the bumper. For this purpose, it is necessary that the deformation element 3 can easily be deformed within a defined speed range which, for example, is a range of approximately 20 km/h to approximately 50 km/h, and will therefore be soft.

Correspondingly, the control unit controls the vibration-generating device such that the deformation element 3 will be set in vibration only when the vehicle is moving within the above-mentioned speed range. The requirement condition is therefore the above-mentioned speed range.

According to a modification of the embodiment, it is further contemplated that the control unit would switch on the vibration-generating device as an additional requirement condition only if an imminent collision with a pedestrian is detected by way of a suitable sensor system.

In cases in which the vehicle travels more slowly than 20 km/h or more rapidly than 50 km/h, the vibration-generating device will not be activated, so that the deformation element 3 will be comparatively hard in order to better be able to contribute to the absorption of collision energy for the protection of a vehicle occupant. In this case, the thixotropic material 7 will be in a high-viscosity, solid or solid-like state.

Figure 2:
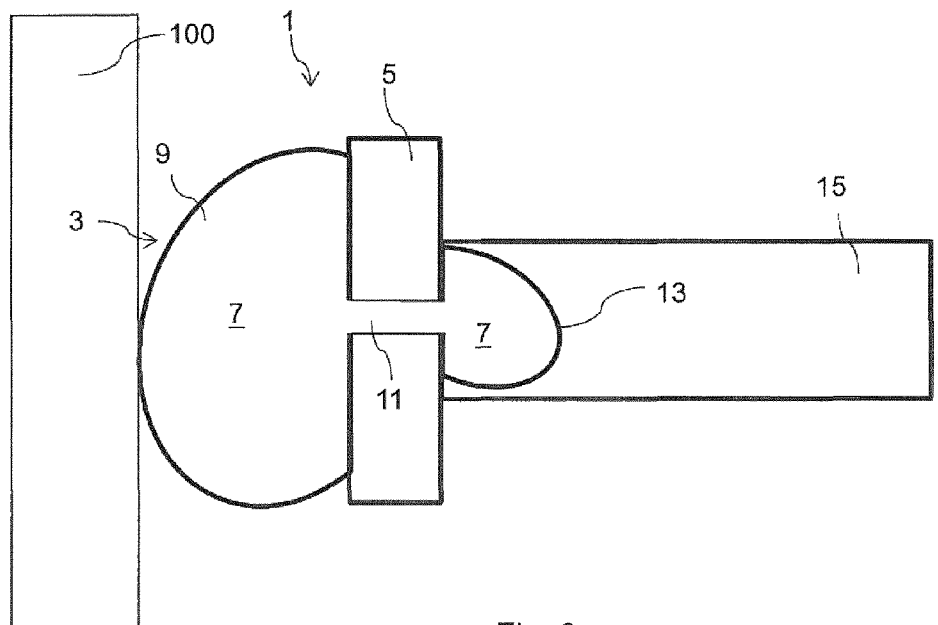
FIG. 2 is a schematic sectional lateral view of a deformation element arrangement according to an embodiment of the present invention during a collision.

FIG. 2 illustrates a collision with a pedestrian 100 who impacts on the deformation element 3, in which case, the thixotropic material 7 had previously been changed by the vibration generating device to a low-viscosity, fluid-like state, so that it can be easily deformed and is therefore softer. In addition, an opening 11 is provided in the shell 9 and the bumper cross member 5, through which opening 11 the thixotropic material can flow out of the shell 9 in the low-viscosity state, so that the deformation element 3 behaves even more softly during the collision, i.e. a deformability of the deformation element 3 is even greater. Behind the opening 11, on a rearward side of the bumper cross member 5 facing away from the deformation element 3, an elastic reservoir 13 is provided, in which the outflowing thixotropic material 7 can be caught.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A deformation element arrangement for a motor vehicle, comprising:
    a deformation element, and
    a vibration-generating device coupled with the deformation element, wherein
    the vibration-generating device is arranged and constructed such that, when required, the deformation element is set in vibration so that a deformation behavior and/or a flow behavior of the deformation element is varied in accordance with a requirement condition,
    the deformation element comprises an elastic shell filled with a thixotropic material or a rheopectic material.

2. The deformation element arrangement according to claim 1, wherein
    the deformation element is mountable on the motor vehicle and is constructed such that, in an event of a collision of the motor vehicle with a pedestrian, the deformation element dampens an impact of the pedestrian onto the motor vehicle.

3. The deformation element arrangement according to claim 2, wherein
    the deformation element is adapted for being arranged on a forward vehicle end and/or on a rearward vehicle end.

4. The deformation element arrangement according to claim 3, wherein
    the deformation element is adapted to be arranged on a bumper cross member.

5. The deformation element arrangement according to claim 3, wherein
    the deformation element is adapted to be arranged between a bumper covering and a bumper cross member.

6. The deformation element arrangement according to claim 5,
    wherein the deformation element extends essentially over an entire width of the bumper cross member.

7. The deformation element arrangement according to claim 4,
    wherein the deformation element extends essentially over an entire width of the bumper cross member.

8. The deformation element arrangement according to one of claim 1, comprising:
    a control unit which is adapted for controlling the vibration-generating device as a function of a vehicle speed.

9. The deformation element arrangement according to claim 8, wherein
    the control unit is further adapted for controlling or regulating the vibration-generating device as a function of a detection of an imminent collision of the motor vehicle with an object or a pedestrian.

10. The deformation element arrangement according to claim 1, further comprising:
    a control unit which is adapted for controlling or regulating the vibration-generating device as a function of a detection of an imminent collision of the motor vehicle with an object or a pedestrian.

11. The deformation element arrangement according to claim 8, wherein
    the control unit activates the vibration-generating device within a speed range of the motor vehicle that is relevant to a pedestrian protection, and thereby increases a deformability and/or a flowability of the deformation element within this speed range.

12. The deformation element according to claim 11, wherein the speed range is between 20 km/h and 50 km/h.

13. The deformation element arrangement according to claim 9, wherein
    the control unit activates the vibration-generating device when detecting the imminent collision of the motor vehicle with the pedestrian and thereby increases a deformability and/or flowability of the deformation element.

14. The deformation element arrangement according to claim 10, wherein
    the control unit activates the vibration-generating device when detecting the imminent collision of the motor vehicle with the pedestrian and thereby increases a deformability and/or flowability of the deformation element.

15. The deformation element arrangement according to claim 1, wherein
the vibration-generating device is adapted for generating vibrations in an ultrasonic range by way of at least one piezo actuator.

16. The deformation element arrangement according to claim 1, wherein
the deformation element has at least one opening, through which the thixotropic material or the rheopectic material is displaceable as a result of an effect of force.

17. The deformation element arrangement according to claim 1, wherein:
the thixotropic material or the rheopectic material, in a first operating state of the vibration-generating device, is highly viscous or predominantly has properties of a solid material, and
the thixotropic material or the rheopective material, in a second operating state of the vibration-generating device, has low viscosity or predominantly has properties of a fluid.

18. A motor vehicle having a deformation element arrangement according to claim 1.

19. A deformation element arrangement for a motor vehicle, comprising:
a deformation element, and
a vibration-generating device coupled with the deformation element, wherein
the vibration-generating device is arranged and constructed such that, when required, the deformation element is set in vibration so that a deformation behavior and/or a flow behavior of the deformation element is varied in accordance with a requirement condition, and
the vibration-generating device is adapted for utilizing natural vibrations of the motor vehicle in order to set the deformation element in vibration.

* * * * *